United States Patent

[11] 3,554,212

[72] Inventor William J. Maroney
 Williston Park, N.Y.
[21] Appl. No. 738,255
[22] Filed June 19, 1968
[45] Patented Jan. 12, 1971
[73] Assignee Ritter Pfaudler Corporation
 Rochester, N.Y.
 a corporation of New York

[54] CHEMICAL FEED CONTROLLER
 10 Claims, 3 Drawing Figs.
[52] U.S. Cl..................................................... 137/93
[51] Int. Cl..................................................... G05d 11/08
 G05d 11/13
[50] Field of Search........................................... 137/93, 88

[56] References Cited
 UNITED STATES PATENTS
 2,648,809 8/1953 Grimm........................... 137/93
 2,656,845 10/1953 Lindsay........................... 137/93
 3,217,729 11/1965 Ballestra........................... 137/93
 3,376,883 4/1968 Douty...........................

*Primary Examiner*—William F. O'Dea
*Assistant Examiner*—William H. Wright
*Attorney*—Theodore B. Roessel ABSTRACT: A device for automatically controlling the amount of chemicals introduced into a chemical process is disclosed. The device utilizes a variation in the chemical balance of the process to control a proportioned amount of chemical fed into the system. The proper chemical balance is maintained by compensating for variations in water flow and chemical compositions and automatically adjusting the time duration of the chemical feed to the system. The device allows chemicals to be fed to the system for a controlled time and then senses the effect on the system. If the effect deviates from a desired result, the device makes an appropriate change in the feed cycle by increasing or decreasing the cycle. The device also contains means for delaying the feed changes until the result of a previous change is effective and contains means to adjust the percentage limit of change.

INVENTOR
WILLIAM J. MARONEY

BY Theodore B. Roemel

ATTORNEY

INVENTOR
WILLIAM J. MARONEY

CHEMICAL FEED CONTROLLER

BACKGROUND OF THE INVENTION

This invention relates generally to a chemical feed controller and more particularly to a device capable of observing the chemical balance of a process, detecting a variation from a predetermined set point in the chemical balance, making an incremental correction and waiting for the correction to become effective before making subsequent corrections which vary the chemical balance according to the effect of previous corrections.

In the chemical process industry, the problem of constantly feeding the proper amount of a given chemical to the chemical process is well known. A basic control system may employ a chemical tank containing detecting means for detecting the chemical balance of the process and means for feeding chemicals to the tank whenever the detecting means signifies a chemical balance over or under a desired set point.

An example of a basic control system is shown in FIG. 1 of the drawings wherein there is shown diagrammatically a precipitator 10 containing an inlet trough 12, mixing zone 14, upflow zone 16 and clear well 18. A lime feed pump 20 is used to feed lime from a lime tank 22 to the precipitator 10 by means of the conduit 23, 25 and 27, at a rate controlled by a control device 24. The control device 24 is activated by a flow contact meter 26 and responsive to signals from a pH probe 28 which observes the chemical balance of the precipitator 10.

In a typical system such as this, the control device 24 then controls the flow of lime through the conduits 23, 25 and 27 to the precipitator.

When using such control devices on systems having short transportation or process reaction lags, the problem of controlling the proper amount of chemical is minimal. However, on systems having long lags, the standard control systems heretofore known and used had inherent problems built into the system.

Prior art control devices of this type having no delaying means built in, often over corrected the amount of lime introduced into the precipitator 10. Such over correction was caused by the pH probe 28 giving a false pH reading before the previously admitted lime had a chance to dissipate throughout the system. As a result, the controller 24 would allow too much lime to be introduced into the system and would therefore over correct the chemical balance which would compound the error.

SUMMARY OF THE INVENTION

The present invention overcomes the difficulties and limitations found in prior controllers 24 by having built within the controller means for making an incremental correction to the chemical balance and means for waiting an adjustable predetermined length of time for the correction to become effective. After the predetermined length of time, the controller 24, as will be described hereinafter, makes additional incremental corrections when necessary.

Accordingly, it is an object of the invention to provide a new and novel chemical feed controller which is able to control chemical processes having long lag times, as well as short lags, by making incremental corrections, sensing the effect of the correction and making further incremental corrections where necessary.

Another object of the invention is to provide a new and novel device which is capable of being adapted to control the flow of lime to a precipitator without excessive over correcting or hunting.

It is also an object of the invention to provide a controller for a process wherein a material is acted upon by a control agent fed to said process and the controller causes said control agent to be fed to the process for a time period substantially proportional to the amount of said material, and, wherein, while said control agent is being fed, the controller observes the process and adjusts said period so as to prevent said control agent from being fed either in excess, or in insufficient amount. More particularly, the controller observes the effect of said control agent on said material for indication of such excess or insufficient amount, and adjusts the said period less if initial observance of such excess or insufficient amount is next succeeded by observance of such insufficient amount or excess, respectively.

These and other objects and advantages of the invention will become more apparent from a study of the attached drawings and from a reading of the description of the preferred embodiments.

DESCRIPTION OF THE PREFERRED EMBODIMENTS

Figure 1:
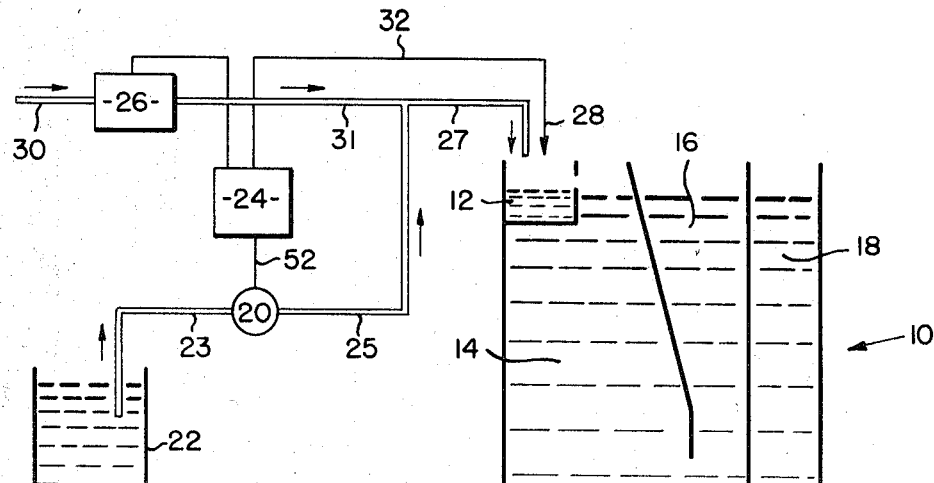
FIG. 1 is a diagrammatic of a basic chemical system utilizing the invention.

Referring more particularly to the drawings, as before mentioned there is shown in FIG. 1, the controller 24 of the invention as used to control the flow of lime from a lime tank 22 to a precipitator 10. In such a system, the pH probe 28 serves as a means for detecting and transmitting a deviation signal indicating the direction of deviation of the pH content of the precipitator water above or below a given set point. The signal detected by the pH probe 28 is transmitted to the controller 24 by means of electrical conduit 32.

Figure 2:
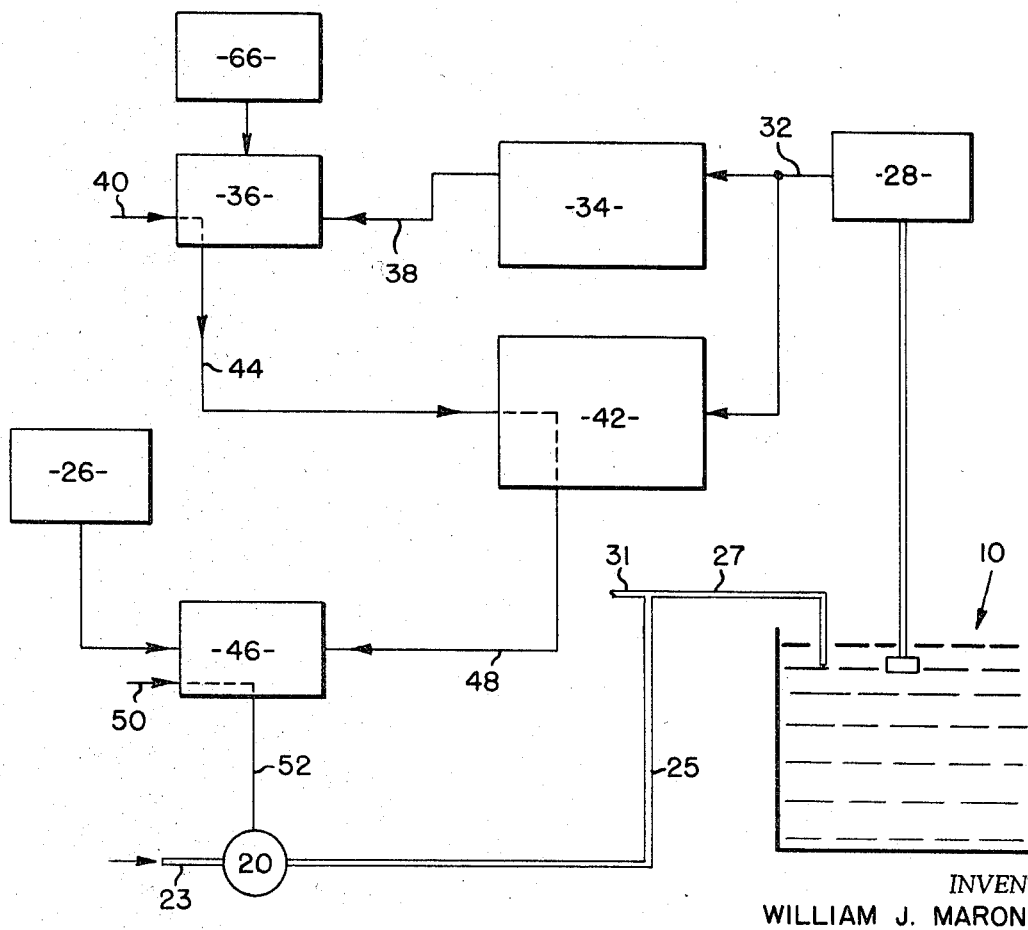
FIG. 2 is a block diagram of the control system.

Referring now more particularly to FIG. 2, the deviation signal is received from the pH probe 28 by a second means 34 which serves to convert the detecting signal to a first resistance signal and to transmit this first resistance signal to an increment timer 36 by means of the electrical conduit 38. The increment timer 36 serves to control the flow of electrical current from an external electrical current source flowing by electrical conduit 40 to a third means 42 by means of the electrical conduit 44. The third means 42 is also responsive to the deviation signal received from the pH probe 28 and serves to convert the flow of electrical current from the external electrical current source flowing through electrical conduit 44 to a second resistance signal which is then transmitted to a feed timer 46 by means of electrical conduit 48.

The feed timer 46, being responsive to the second resistance signal received from the third means 42 then controls the time duration of flow of electrical current from an external electrical current source 50 to the chemical feeder pump 20 by means of electrical conduit 52. Associated with the feed timer 46 and increment timer 36 are means for periodically starting the timers as will be more fully explained hereinafter.

Figure 3:
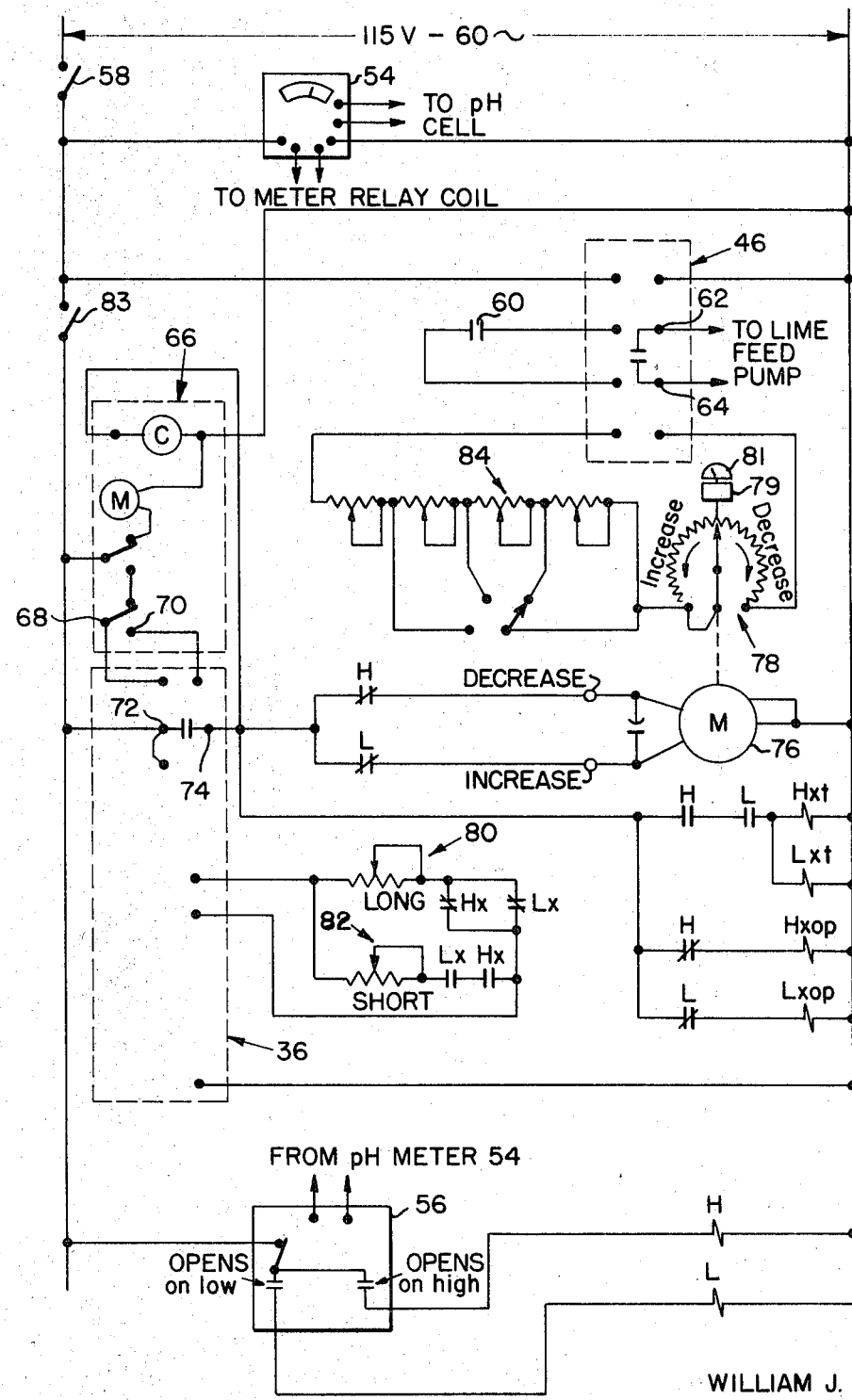
FIG. 3 is an electrical circuit diagram showing the components parts of the control system.

Referring now to FIG. 3, there is shown an electrical circuit diagram of the component parts of the controller 24, the flow contact meter 26 and the pH probe 28. The pH probe 28 comprises a standard pH meter 54 and a meter relay 56 connected in the circuitry as shown in FIG. 3.

In operation of the system, a power supply switch 58 is closed causing the pH meter 54 and meter relay 56 to detect and indicate the pH content of the water and chemical mixture in the inlet trough 12 of the precipitator 10.

Each volume of water admitted to the precipitator through the conduits 30, 31 and 27 causes the flow contact meter 26 to close the water flow contact switch 60 which triggers the lime feed timer 46 closing its output contacts 62 and 64 and in turn causing the lime feed pump 20 to run. The lime feed timer 46 is an electronic timer whose time duration is determined by the value of its R/C time constant which may be changed by varying an external resistance. When the lime feed timer 46 completes its time cycle, the lime feed pump 20 stops until a succeeding water flow causes the water flow contact switch 60 to close and again repeat the cycle.

In order to more fully understand how the R/C time constant of the feed timer 46 is varied thereby varying the length of time that the feed pump 20 will run, reference should now be made to the operation of the pH probe 28. When the pH of the precipitator 10 is above set point, the high contacts of the meter relay 56 open and deenergize relay H. When the pH content of the precipitator 10 is below the set point, the low contact of meter relay 56 opens and deenergizes relay L. When the pH is on the set point of the system, both relays H and L are energized.

The increment timer 36 is periodically started by starting means such as a sample timer shown generally by dashed lines 66 on FIG. 3. The function of the sample timer 66 is to periodically trigger the increment timer 36 and associated electrical equipment to make a correction in the system at predetermined times. While its operation is a repeating time cycle and is not changed by the pH reading of the pH probe 28, the time the increment timer 36 runs and therefore the magnitude of the change permitted is determined by later changes which will be more fully described hereinafter.

Upon timing out, the sample timer 66 closes electrical contact 68 and 70 to thereby trigger the increment timer 36, whose function is to control the magnitude of the increment correction.

When the increment timer 36 is triggered by the sample timer 66, the contacts 72, 74 of the increment timer 36 close and allow a potentiometer drive motor 76 to run in a direction determined by the pH of the system. If the pH is high, indicating too much lime is being added to the system, relay H will be deenergized and the potentiometer drive motor 76 will run in a direction to drive the potentiometer 78 to a lower resistance value. This in turn decreases the R/C time constant of the feed timer 46 which in turn reduces the duration of the feed of lime into the precipitator 10. When the pH is low, relay L will be deenergized and the potentiometer drive motor 76 will run in the opposite direction, thereby increasing the R/C time constant of the feed timer 46 and increasing the feed time of lime into the precipitator 10. When the pH is on the set point, both relays H and L will be energized and the potentiometer drive motor 76 will not reposition the potentiometer 78.

The potentiometer 78 may be manually controlled by means of the knob 79 and for this purpose a dial 81, indicating the time settings, is incorporated into the potentiometer 78. When the system is controlled by manual operation, a manual-automatic selector switch 83 is placed in the manual operation thereby allowing the controller to operate without the automatic feature before mentioned.

The magnitude of the time increment added to or removed from the feed timer 46 is determined by the time setting of the increment timer 36 which determines the length of time the potentiometer drive motor 76 will run to reposition the potentiometer 78. This time duration of the increment timer 36 is determined by the settings of the potentiometer 80 or the potentiometer 82, which is selected by the contacts of relays $H_r$ and $L_r$.

The relays $H_r$ and $L_r$ are standard two coil, "memory" latch type relays of the type having operating coils ($H_r$ op and $L_r$ op) which are energized to pull in and mechanically latch the relay contacts in the operated position. With such relays when the $H_{r\ op}$ and $L_{r\ op}$ coil are later deenergized, the relay will still remain in the operated position. The relays have trip coils ($H_{r\ t}$ and $L_{r\ t}$) which when energized cause the mechanical latch to open and drop the relay out.

As explained above, the relay $H_r$ is energized and latched when the pH is high, while the relay $L_r$ is energized and latched when the pH is low. Upon deviation of the pH from the set point, initially, relay H or L will be deenergized and further when the increment timer 36 is triggered, $H_r$ or $L_r$ will be energized and latched. When either $H_r$ or $L_r$ is latched, the time duration of the increment timer 36 is determined by the potentiometer 80 which is set for a "long" increment of time. When both $H_r$ and $L_r$ are latched, which occurs whenever the pH is overcorrected, the time duration of the increment timer 36 is determined by the potentiometer 82 which is set for a "short" increment of time. Thus, the incremental change in the potentiometer 78 in the initial direction is reduced if the control system overshoots the set point of the pH balance and reverses direction, thereby allowing only small corrections until the set point is reached. When the pH has arrived at the set point, both $H_r$ and $L_r$ are tripped and the system will make no further changes until a new departure from set point occurs. The output of the increment timer 36 is also used to reset the sample timer 66.

A minimum feed range selector switch 84 is also provided to permit the selection of a preset minimum time of chemical feed to the precipitator 10, to which is added the automatically adjusted time interval determined by the setting of the potentiometer 78. This provides a means of adjusting the limits of percentage feed change which the potentiometer 78 is capable of producing. Since the sample timer 66 allows the time period between incremental timer adjustments to be preset, the chemical process is able to react to the previous change and stabilize before additional changes or corrections are made. As a result, the controller may be used on processes having long transportation or process reaction lags, which are normally impossible to control, as well as on systems having short lag times.

While the sample timer 66 may be a continuously recycling timer which triggers the increment timer 36 and is then subsequently reset by the output of the increment timer 36, it may be replaced with a counter which would totalize pulses from a metering device. The counter in turn would then initiate the increment timer 36, and then be reset by the output of the increment timer 36. It can also be seen that the control system of the invention may be used in other applications than the one shown in the preferred embodiments, and accordingly, the flow contact meter 26 functioning to turn the system on and off may be replaced with a different type of switch which functions in the same manner, such as a temperature switch, pressure switch or level switch, etc.

In addition, the measurement sensing element shown as a pH meter in the preferred embodiment may be another type of chemical balance detecting instrument such as conductivity, ORP or other analytical measurement device. It may also be a switch sensing temperature, pressure, level, volume or flow or other type of sensing device.

It should also be obvious that the output section of the controller may be used to control other devices such as a potentiometer input to adjust speed, a photo transducer, a differential transformer, a pneumatic signal or various types of alarms in place of driving the potentiometer controlled feed timer 46 as hereinbefore described.

From the foregoing description, it can be seen that there is provided a new and novel control device which is capable of maintaining the proper chemical balance of a chemical system by observing the chemical balance of the system detecting a variation from a predetermined set point, making an incremental correction in the chemical balance and waiting a predetermined time for the correction to become effective before making subsequent corrections in the system. Such a control device may be utilized to control chemical processes having long lag times as well as short lag times and is especially adapted to controlling the flow of lime to a precipitator as hereinbefore described. From a reading of the foregoing specification and a study of the attached drawings, it is apparent that many changes in the details of construction and arrangement of the parts may be made without departing from the spirit and scope of the invention as expressed in the accompanying claims and the invention is not to be limited to the exact manner shown and described as the preferred embodiments has been given by way of illustration only.

I claim:

1. A process control device of the type wherein the device observes the chemical balance of a process, detects a variation from a predetermined set point, incrementally corrects the chemical balance of the process by controlling the duration of flow of electrical current from an electrical current source to a chemical feeder for the process, waits a predetermined length of time for the correction to become effective, observes the process again and makes additional incremental corrections when necessary, automatically correcting itself whenever an overcorrection occurs, comprising:
  a. first means for detecting a deviation from a predetermined set point and transmitting a deviation signal indicating the direction of said deviation;
  b. second means for receiving the deviation signal, converting said signal to a first resistance signal and transmitting said first resistance signal, said second means adapted to respond to successive high or low deviation signals to produce a high first resistance signal and to respond to successive different deviation signals to produce a low first resistance signal;
  c. an increment timer, responsive to the first resistance signals for controlling the time duration of a flow of electrical current from the electrical current source, said timer adapted to run for a long time interval when said first resistance signal is high and for a short time when said first resistance signal is low;
  d. third means for receiving the electrical current from the electrical current source converting the current to a second resistance signal and transmitting said signal, said second resistance signal adapted to respond to said high and low deviation signals to increase said second resistance signal when receiving a high deviation signal and to decrease said second resistance signal when receiving a low deviation signal, the magnitude of change of said second resistance signal being controlled by the duration of time said increment timer runs;
  e. a feed timer, responsive to the second resistance signals for controlling the time duration of a flow of electrical current to the chemical feeder so that the amount of chemical feed into the process is controlled; and
  f. fourth means, associated with said feed and incremental timers, for periodically starting said timers at predetermined times to allow the chemical process to react to the previous addition of chemical before making a succeeding correction when necessary.

2. The device as described in claim 1 and further characterized by said third means comprising:
  a. a reversing motor;
  b. a variable resistance, associated with said reversing motor, and being driven thereby;
  c. motor control means, associated with said first means, said reversing motor and the flow of electrical current from said incremental timer and responsive to the deviation signal received from said first means, for controlling the flow of electrical current from said incremental timer to said reversing motor in a manner causing said reversing motor to run in a direction determined by the signal received from said first means thereby converting the flow of electrical current from said incremental timer to a second resistance signal; and
  d. means for transmitting said second resistance signal to said feed timer.

3. The device as described in claim 2 and further characterized by said third means comprising a second variable resistance, externally controlled, and interposed between, and associated with, said variable resistance and said transmitting means, for increasing or decreasing the magnitude of said second resistance signal transmitted to said feed timer.

4. The device as described in claim 3 and further characterized by comprising; fourth means comprising:
  a. a water flow meter contact, associated with said feed timer, for periodically starting said feed timer upon initiation of a flow of water to the process; and
  b. a continuously recycling timer, associated with said increment timer for periodically starting said increment timer at predetermined times, said cycling timer being reset by said increment timer.

5. A controller for controlling a process wherein a material is acted upon by a control agent, the effect of such action being observed in order to detect whether there is an excess of said material with respect to said control agent, or vice versa; said process having means for feeding said control agent to the process for a feed time period substantially proportional to the amount of said material; and said feed time period being adjusted in length during feeding to prevent said excess, said controller comprising, in combination:
  a. a feed timer having a running time period adjustable over a range including said feed time period, for causing said means for feeding to feed said control agent for said feed timer's running time period as adjusted;
  b. detecting means associated with said process for detecting said excess and for producing, in response to detection of said excess, an excess signal providing an indication that said excess exists, and an indication of whether said control agent or said material is in excess;
  c. adjusting means connected to said feed timer for adjusting said feed timer's running time period in accordance with the sense and duration of said excess signal, for causing said means for feeding ultimately to feed more or less of said control agent as needed;
  d. converting means interconnecting said adjusting means and said detecting means for converting said excess signal into an adjusting signal adapted to cause said adjusting means to adjust said feed timer's running period an amount corresponding to the sense and duration of said excess signal.

6. The controller of claim 5, wherein said converting means is responsive to said excess signal to cause said adjusting signal to have a first character, if, in the then-obtaining running time period of said feed timer, indication, by said excess signal, of excess of said material or of said control agent, is not the next successor to indication, by said excess signal, of excess of respectively, said control agent or said material, said converting means also being responsive to said excess signal to cause said adjusting signal to have a second character, if, in said then-obtaining running time period of said feed timer, indication, by said excess signal, of excess of said material or said control agent, is the next successor to indication, by said first signal, of excess of respectively, said control agent or said material; and
  e. said adjusting means including means for setting, during the first said feed time period, the maximum possible amount of adjustment thereof due to an excess signal which produces an adjusting signal of said first character; and the maximum possible amount of adjustment thereof due to an excess signal which produces an adjusting signal of said second character, the first said amount being different from the second said amount.

7. The controller of claim 5, wherein said adjusting means includes an increment timer having an adjustable running time period, and said increment timer being effectively responsive to said adjusting signal to have its said running time period adjusted to be longer for adjusting signal of one of said characters, than for adjusting signal of the other said characters; said adjusting means being adapted to adjust said feed timer's running time period only as long as said increment timer runs.

8. The controller of claim 7 wherein said adjusting means is adapted to continuously adjust said feed timer's running time period at a predetermined rate, and just so long as said increment timer's running time period length adjustment remains continuously that corresponding to a single said character of said second signal.

9. The controller of claim 6 wherein said first said amount is larger than said second amount.

10. The controller of claim 7, wherein the running time period of said increment timer is longer for adjusting signal of said first character, than for adjusting signal of said second character.